3,513,073
NOVEL LIPASE COMPOSITION AND METHOD
FOR PRODUCING SAME
Roland Yves Mauvernay, La Baumette Riom, Puy de Dome, France, and Pierre Laboureur and Michel Labrousse, both of 30 Rue de Versailles, Seine et Oise, France
Continuation-in-part of application Ser. No. 455,889, May 14, 1965. This application July 1, 1968, Ser. No. 746,692
Int. Cl. C07g 7/02; C12d 13/10; A61k 19/00
U.S. Cl. 195—62                                                    7 Claims

ABSTRACT OF THE DISCLOSURE

A stable lipase of high activity is prepared by cultivating the micro-organism Rhizopus arrhizus var. delemar in a culture medium with aeration and stirring until the medium exhibits a constant enzymatic activity, separating from the medium a filtrate and collecting the lipase contained in said filtrate.

CROSS-REFERENCE TO RELATED APPLICATIONS

This application is a continuation-in-part of copending application Ser. No. 455,889, filed May 14, 1965, now abandoned.

BACKGROUND OF THE INVENTION

Field of the invention

The invention relates to enzymes of the class known as lipases and in particular to an active, novel lipase and methods for preparing and using said lipase.

Description of the prior art

It is known that the lipases are very important enzymes in the metabolism of lipids since they cause the hydrolysis of triglycerides which are transformed into diglycerides, monoglycerides, glycerol and fatty acids. A product of this type, i.e. a lipase, has therapeutic application in the treatment of gastro-intestinal disturbances, dyspepsias, cutaneous manifestations of digestive allergies and the like.

However, the only lipases heretofore used have been products derived from ground, dried pancreas, and which have numerous disadvantages. The disadvantages of such lipases are that they have very limited activity resulting from the origin of the lipases; their field of activity is limited to a pH range of 7.5–9.5, and, in particular, their considerable instability which, when combined with their unpleasant taste and odor, results in a product which is extremely poorly suited to pharmaceutical requirements.

Certain investigators have heretofore described the lipase character of certain fungus cultures, and have also hypothesized about the formation of lipases in those cultures. However, in most of these cases, it has proven impossible to isolate the lipases by reason of their endocellular character and their remarkable properties have not been ascertained. Attempts at isolation of these lipases have never gone beyond the laboratory scale, so that production on an industrial scale has never been considered.

SUMMARY OF THE INVENTION

The invention is directed to a novel lipase useful in the treatment of gastro-intestinal disturbances, dyspepsias, cutaneous manifestations of digestive allergies and the like.

The lipase is produced by cultivating a micro-organism of the Mucoraceae group, said organism being Rhizopus arrhizus var. delemar, a strain of which is on deposit and registered at the Museum of Natural History in Paris; Registration No. 1916, and which is available to the public and has been so available to the public since the filing hereof without applicants' permission.

The organism is grown at 20 to 35° C. in a culture medium containing those organic substances and minerals generally used for cultivating micro-organisms and in addition, those substances which lead to the production of exocellular lipases. Growth is continued until the medium exhibits constant enzymatic activity. Thereafter the medium is filtered and the lipase contained in the filtrate is separated therefrom by precipitation, salting out or the like.

The novel lipase obtained by the present method has a considerably higher activity than those lipases heretofore known and in addition, the use of the particular micro-organism contemplated by the present invention leads to the production of greater quantities of lipase than does the use of other similar micro-organisms.

DETAILED DESCRIPTION OF THE INVENTION

Figure 1:
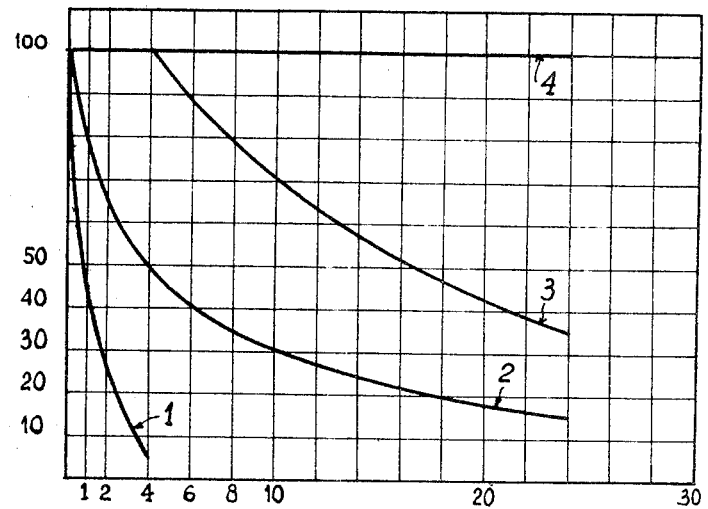
FIG. 1 is a graphical representation of the stability of the novel lipase at varying temperatures and times.

The novel lipase according to the present invention is essentially distinguished from known lipases in that, to a large extent, the disadvantages of the known lipases are avoided by reason of the particular micro-organism from which the lipase is derived.

The new lipase results from the culture of a micro-organism of the Mucoraceae group, in particular from Rhizopus arrhizus var. delemar; Registration No. 1916; Museum of Natural History, Paris, from which it is easily isolated since it is extra-cellular in nature. The novel lipase is very active, very stable, and free of unpleasant odor.

The lipase according to the invention is thus clearly distinguished from heretofore known lipases and thus constitutes a new product which is therapeutically useful in the above-mentioned areas.

The characteristics of the lipase will be hereinafter described in detail, but it is noted that it is not possible to exactly state the constitution thereof, so that the new lipase will be identified on the one hand by the process by which it is obtained, and particularly by the nature of the micro-organism cultivated and by the culture medium, and on the other hand by its biological properties.

It is known that certain families of the Mucoraceae group will lead to the production of lipases. Among the Mucoraceae, only certain families have in fact been shown to be capable of producing a lipase as can be seen from the following Table I.

TABLE I

| Family | Hours of culture (units/ml.) | | |
|---|---|---|---|
| | 21 | 41 | 64 |
| Rhizopus arrhizus var. delemar | 63 | 275 | |
| Mucor hiemalis | 56 | 68 | |
| Mucor racemosus | 2 | 0 | 0 |
| Mucor mucedo | 0 | Traces | 0 |
| Rhizopus arrhizus | 46 | 72 | |
| Mortierella alpina | Traces | Traces | Traces |

The method whereby the evaluation of this growth is made, and the unit of activity of the lipase, will now be explained and defined.

In a 150 ml. beaker are placed 7.5 ml. of an emulsion of neutralized olive oil resulting from a preparation containing 50 cc. of neutral oil, 50 cc. of 3% polyvinyl alcohol and 25 cc. of distilled water, 5 cc. of an 0.1 M solution of calcium chloride, 1 cc. of a 20% human albumin solution and 76.5 cc. of distilled water at 37° C. The pH of this preparation is adjusted to 7.6 with 0.1 N sodium hydroxide. A predetermined quantity of the enzymatic solution to be measured is then added and a chronometer is set in operation. Each time the pH reaches the value of 7.6, the time indicated and the number of ml. of 0.1 N sodium hydroxide needed are noted. The enzyme is allowed to act upon the substrate for approximately 10 minutes, after which a graph is made of the time in seconds as a function of the number of micro-moles of sodium hydroxide. This graph includes one section in which at least 3 points are in a straight line, at around 0.8 ml. From this straight line section, the number of micro-moles of sodium hydroxide used in one minute for the quantity of enzyme used is calculated. The quantity of enzyme, under the thus defined measuring conditions, liberates in 1 minute a quantity of fatty acid which may be neutralized by 1 micro-mole of sodium hydroxide is defined as one unit.

This is the method of measuring the activity of the lipase and the unit thereof to which reference will be made throughout.

The method of the invention whereby the new lipase is produced by culturing a strain of *Rhizopus arrhizus* var. *delemar* will now be described.

By way of example, reference will be made to a method for producing, on an industrial scale, the fungus lipase according to the invention by the culture of *Rhizopus arrhizus* var. *delemar*. It is possible, on the basis of this culture, to easily isolate a very active lipase from the filtrate of the culture in which the micro-organism is cultivated, almost all the lipase thus produced being exocellular. The product thus obtained is very active, stores well and does not have any unpleasant odor.

Since the family used is *Rhizopus arrhizus* var. *delemar*, the culture is seeded with a pre-culture in a liquid medium constituted in such a manner as to obtain maximum growth of the fungus in a very short time, namely in less than 24 hours. This pre-culture is effected with aeration and stirring at a temperature of between 20 and 35° C. Any medium allowing good and rapid growth of the organism may be used.

The culture medium may contain all the organic substances and minerals necessary for good growth of the micro-organism as well as those substances necessary for the abundant production of exocellular lipases. Since they are a source of carbon, the most favorable substances are starches, dextrins, and hydrolyzed flours. The most favorable nitrogen sources are ammonia salts, nitrates, soluble maize extract, peptones and casein. The mineral elements which the medium should contain are potassium, magnesium, calcium, phosphorous, sulphur and chlorine. Vitamins such as thiamine, riboflavin, niacin, pyridoxine, pantothenic acid, biotin, folic acid and inositol are favorable to the growth of the fungus and to the production of the lipase, but are not indispensable. The pH of the medium before seeding should be between 5 and 7. It may be adjusted to that pH by means of ammonia or 2 N sulphuric acid.

The cultures are effected as deep cultures with aeration and stirring. The rate of these two factors, i.e. aeration and stirring may vary depending on the installation used for cultivation, but it should be noted that too great an aeration may harm the production of the lipase.

Throughout the duration of the culture the medium is maintained at a temperature of 20 to 35° C.

Culturing is continued until the enzymatic activity reaches a certain level, i.e. until the same number of lipase units are obtained for two successive measurements effected at hourly intervals.

At the end of the culturing period, the medium is filtered to eliminate the mycelium. The liquid phase, or filtrate, is then collected for the extraction of the lipase. Since this lipase is soluble in water but insoluble in organic solvents and in concentrated aqueous solutions, it may easily be separated from the filtrate either by precipitation by an organic solvent miscible with water (preferably acetone), or by being salted out, preferably with ammonium sulphate.

The precipitate thus obtained is centrifuged and is then dried under vacuum.

In order to increase the activity and reduce the quantity of impurities in the raw product thus obtained, it is possible to further purify same by redissolving the product and reprecipitating the product, for example, by fractional precipitation using either solvents or salts.

After drying, a powdered product is obtained which has a very high lipase activity, the titer of which varies between 5,000 and 12,000 lipase units per gram, according to the richness of the filtrates of the culture and the number of precipitations performed.

It will be seen from the following further description that there are purification processes, within the scope of this invention, yielding products of even higher activity, which may reach as high as 3,000,000 units per gram.

The novel lipase of the invention will now be described in terms of its properties and characteristics. After drying the lipase, there is obtained an amorphous powder which is soluble in water (the pH of an aqueous solution thereof being approximately 5.5) and in the usual buffer solutions; insoluble in alcohol, ether, organic solvents and very concentrated solutions of mineral salts.

Figure 2:
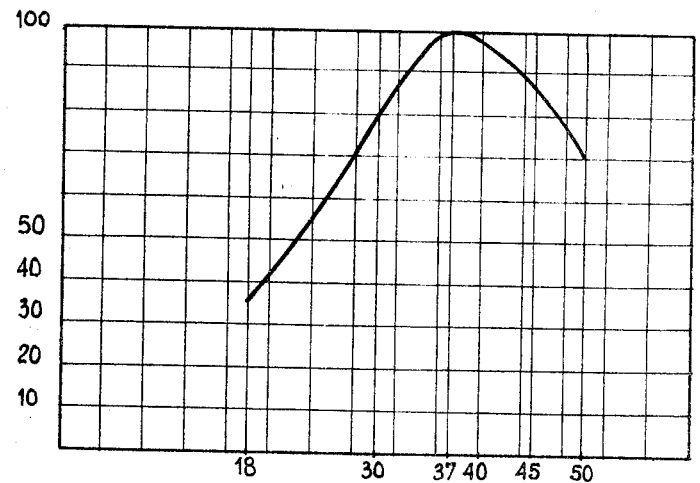
FIG. 2 is a graphical representation of the relative activity of the lipase as a function of the temperature at which the micro-organism is cultivated.
Figure 3:
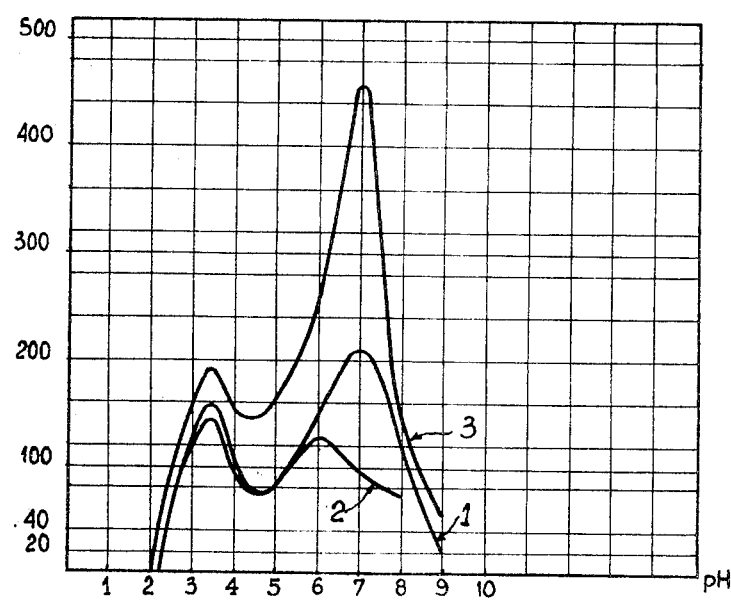
FIG. 3 is a graphical representation of the enzymatic activity of the novel lipase on various substrates.
Figure 4:
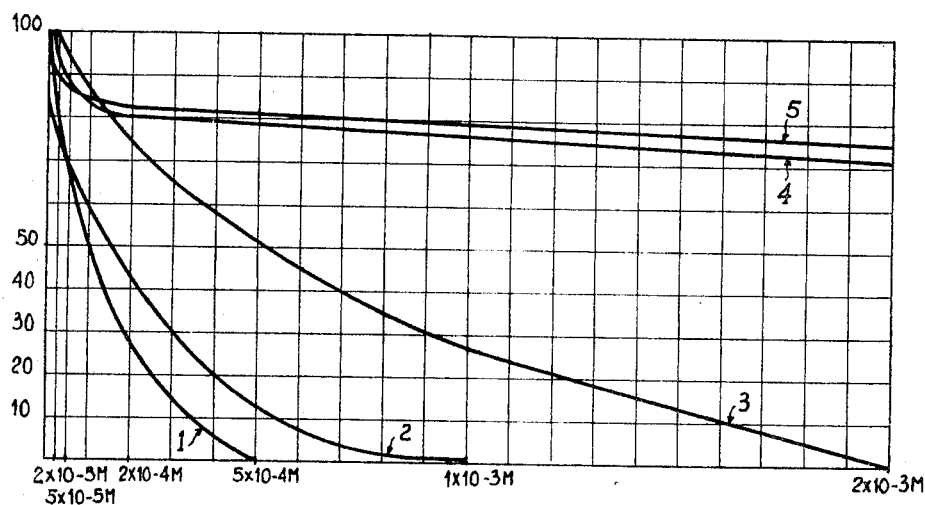
FIG. 4 is a graphical representation of the influence of various metal ions on the activity of the novel lipase.
Figure 5:
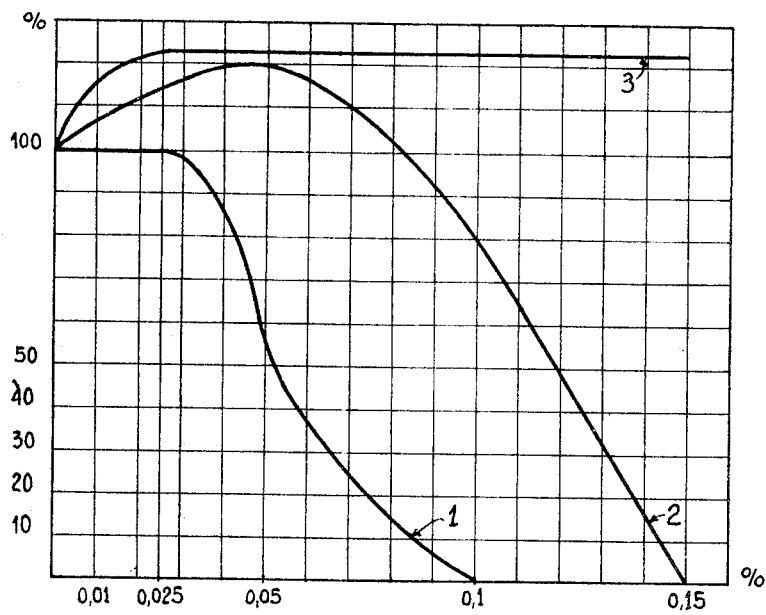
FIG. 5 is a graphical representation of the influence of bile and bile salts on the activity of the novel lipase.

This lipase is essentially characterized by its biological properties which will be enumerated hereinafter with reference to the annexed drawing, in which:

FIG. 1 depicts a series of stability curves of the lipase in 1 mg./ml. solution, as a function of time and different temperatures; the curves 1, 2, 3 and 4 show respectively the variations in lipase activity as a percentage which is a function of the time in hours, at 50, 37, 20 and 0° C.;

Thus, at 0° C. the lipase retains its full activity even after 24 hours (curve 4). At the other temperature extreme, i.e. 50° C. (curve 1), the lipase loses about 95% of its activity within 4 hours and over 50% within one hour;

FIG. 2 shows the effect of the incubation temperature (in ° C.) on the activity (in percent) of the lipase. Thus, maximum activity is achieved by incubating at 37° C.;

FIG. 3 shows the enzymatic activity of the powdered lipase on different substrates, measured in micro-moles of sodium hydroxide as a function of the pH, the curves 1, 2 and 3 showing respectively the effect of 50 units of lipase on three grams of olive oil, the effect of 150 units of lipase on three grams of tributyrin and the activity of 50 units of lipase on 3 grams of triolein;

FIG. 4 illustrates the effect of various metal ions on the activity of the lipase, expressed in percent activity as a function of the metal concentration of the enzyme- substrate mixture, curves 1 to 5 referring respectively to the effect of ions of zinc, mercury, cupric copper, ferric iron and cobalt; and FIG. 5 illustrates the influence of bile on the lipase, expressed as the variation in percent activity of 5 mg. of powdered lipase as a function of the concentration (percent) of bile salts in the enzyme-substrate mixture, curves 1, 2 and 3 referring respectively to the action of desoxycholic acid, sodium taurocholate and sodium cholate.

The experimental data on which FIGS. 1–5 are based will now be described in greater detail.

The stability of the lipase was first studied.

In the dry state, the enzymatic powders obtained did not undergo any loss of activity after several months of storing in an oven at 37° C.

In an aqueous solution of 1 mg./ml., the stability of the lipase was studied, first as a function of the temperature for variable periods with the result as given in Table II.

TABLE II

| Storage time (in hours) | Percent activity (activity at 0° C=100%) | | | |
| --- | --- | --- | --- | --- |
| | Storage at 0° C. | Storage at 20° C. | Storage at 37° C. | Storage at 50° C. |
| 0.5 | 100 | 100 | 92 | 68 |
| 1 | 100 | 100 | 79 | 42 |
| 1.5 | 100 | 100 | 69 | 35 |
| 3 | 100 | 100 | 54 | 13.5 |
| 4 | 100 | 100 | 49 | 5 |
| 8 | 100 | 80 | | |
| 24 | 100 | 35 | 30 | |

These results are as shown in FIG. 1.

The stability of the same solution was then studied as a function of the pH, with pH values varying between 2 and 9, for varying periods at 0° C. The results are given in Table III, and are evaluated as a percentage relative to a solution having a pH of 5.7, which is the natural pH of the solution.

TABLE III

| Storage time (in hours) | Residual activity | | | | | | | |
| --- | --- | --- | --- | --- | --- | --- | --- | --- |
| | pH 2 | pH 3 | pH 4 | pH 5.7 | pH 6 | pH 7 | pH 8 | pH 9 |
| 0 | 4 | 100 | 100 | 100 | 100 | 100 | 100 | 100 |
| 1 | 0 | 95 | 100 | 100 | 100 | 100 | 100 | 100 |
| 2 | | 81 | 90 | 100 | 100 | 100 | 100 | 100 |
| 3 | | | | | | | | 100 |
| 4 | | 75 | 76 | 100 | 100 | 100 | | 86 |
| 4.5 | | | | 100 | 100 | 100 | 91 | |
| 5 | | 75 | 75 | | | | | 81 |
| 5.5 | | | | 100 | 91 | 91 | 88 | |

These results show that the lipase according to the invention is remarkably stable in solutions with a pH between 3 and 9, maximum stability being observed at a pH of 5.7, i.e. at the natural pH of the solution. It will furthermore be noted that the stability is greater in alkaline media than in acid media.

A study related to variations in activity of the lipase as a function of the incubation temperature will now be described. The results obtained are shown in Table IV and illustrated in FIG. 2, the activity for an incubation temperature of 37° C. being taken as equal to 100% as a reference.

TABLE IV

| Temperature of incubation (° C.) | Activity (percent) |
| --- | --- |
| 18 | 36 |
| 30 | 80 |
| 37 | 100 |
| 40 | 96 |
| 45 | 86 |
| 50 | 70 |

A third study related to the activity of the lipase on different substrates as a function of the incubation pH was conducted and is now described. The substrates were respectively olive oil, tributyrin and triolein.

In each case an emulsion of the substrate was prepared in a solution of 3% polyvinyl alcohol, in the same manner as for the measurement of the olive oil emulsion which was previously described. Tests are carried out in a similar manner in each of the three cases, viz.:

To 7.5 ml. of each emulsion are added 5 ml. of an 0.1 M calcium chloride solution, 72.5 ml. of distilled water at 37° C. and the mixture is brought to the desired pH. 5 mg. (50 units) of enzyme in a 1 mg./ml. solution which was previously brought to the desired pH is then added to the mixture. The mixture is kept at 37° C. and at the required pH for 10 minutes. 10 ml. of ethanol are then added, the pH is brought to 9 and the quantity of 0.1 N sodium hydroxide used is measured, including that which was used to maintain the pH during the enzymatic reaction.

A control test is first effected using a solution without enzyme kept for 10 minutes at 37° C., which is rendered inactive by 10 cc. of ethanol, to which is added the enzymatic solution (after the ethanol). The results obtained with the three substrates are respectively shown in Tables V, VI, and VII and in FIG. 3.

TABLE V

| pH | Number of micro-moles of sodium hydroxide used for the regulation | Total number of micro-moles of Sodium hydroxide used |
| --- | --- | --- |
| 2.25 | 0 | 0 |
| 3.30 | 0 | 149 |
| 4.05 | 0 | 101 |
| 4.95 | 0 | 79 |
| 7.00 | 105 | 209 |
| 7.50 | 162 | 183 |
| 9.00 | 23 | 23 |

TABLE VI

| pH | Number of micro-moles of sodium hydroxide used for the regulation | Total number of micro-moles of Sodium hydroxide used |
| --- | --- | --- |
| 2.10 | 0 | 0 |
| 3.30 | 0 | 141 |
| 4.05 | 15 | 90 |
| 5.00 | 54 | 90 |
| 6.00 | 84 | 129 |
| 7.00 | 90 | 90 |
| 8.00 | 78 | 78 |

TABLE VII

| pH | Number of micro-moles of sodium hydroxide used for the regulation | Total number of micro-moles of Sodium hydroxide used |
| --- | --- | --- |
| 2.55 | 0 | 83 |
| 3.00 | 0 | 148 |
| 3.45 | 0 | 186 |
| 3.95 | 0 | 150 |
| 5.00 | 0 | 158 |
| 5.90 | 0 | 235 |
| 7.00 | 200 | 454 |
| 8.00 | 130 | 130 |
| 9.00 | 48 | 48 |

These data show that the lipase according to the invention is capable of acting on triglycerides at pH values of between 2.5 and 9 and that it has two activity optima, the latter being pH 3.5 and pH 7 in the case of olive oil and triolein and at pH 3.5 and 6 in the case of tributyrin.

This feature of the present lipase is most unexpected since generally, lipases have only one pH activity maximum. The present lipase as already noted has two maxima, one at 3.5 (which approximates the pH of the stomach) and another at around pH 7 (which is the intestinal pH). Thus, the present lipase is effective at any level of the digestive tract, a feature not found in any previously known lipase.

Next, the activity of the present lipase on different substrates was determined, viz. arachis oil, triolein, Tween 20 and mono-acetin, diacetin and triacetin in the same manner as hereinbefore described in the case of olive oil in such a manner as to be able to effect comparison with the latter.

It has been found that on arachis oil and triolein the lipase has an activity substantially equal to that of its activity on olive oil; however it should be noted that in the case of triolein it is necessary to release a far greater quantity of fatty acid to obtain the balance of the different hydrolysis reactions.

With respect to Tween 20, the lipase does not have any activity in the time usually corresponding to the measurement on olive oil; however, after several hours (at least four hours) the beginning of hydrolysis is noted. On the other hand, under the same conditions no hydrolysis is undergone by mono-acetin, diacetin and triacetin.

Finally, studies on the activity of the lipase as a function of and as influenced by various inhibitors, activators and protectors were conducted with the following results:

(a) Mineral compounds

Tests on ions of zinc, mercury, copper, lead, tin, iron, cobalt, aluminum, strontium, magnesium and manganese were carried out in the presence of calcium according to the usual method of measurement. In the case of calcium, which is a strong activator, measurement was carried out by the usual method but without calcium, and an arbitrary value of 100% was given to the activity obtained, the concentration of $5.5 \times 10^{-3}$ M, which gives an activity of 466% with respect to the measurement without calcium, corresponds exactly to the quantity of calcium normally used in the measuring process.

The results obtained are shown in FIG. 4.

Calcium, besides its high activating power, also exerts a protective effect on the aqueous lipase solutions. Thus a 1 mg./ml. lipase solution in an 0.1 M solution of calcium chloride does not undergo any loss of activity after 6 hours at 18° C., while in the absence of calcium the same solution loses 9 to 12% of its activity.

(b) Organic compounds

Different tests were conducted using "Complexon III" which is the sodium salt of ethylene-diamine tetraacetic acid, human albumin, potassium ferrocyanide, cholesterol, urea, Tween 20, sodium laurylsulphate, glycerol, bile salts and oleic acid.

The following results were obtained:

(i) Action of Complexon III: 100% is designated as the activity in the absence of Complexon; said activity is maintained in the presence of a Complexon concentration of $1.1 \times 10^{-4}$ N, and is lowered to 85% at a concentration of $5.5 \times 10^{-4}$ N, to 78% at a concentration of $1.1 \times 10^{-3}$ N and to 15% at a concentration of $5.5 \times 10^{-3}$ N, at which all the calcium is complexed.

(ii) Effect of human albumin: 100% activity being regarded as the measurement in the absence of albumin. It was found that in the presence of 1 ml. of a 20% aqueous albumin solution this activity is increased to 141% and in the presence of 5 ml. of this solution it is brought to 158%.

(iii) Potassium ferrocyanide does not effect either activation or inhibition.

(iv) Cholesterol is a slight lipase activator.

(v) Urea does not cause any changes in the enzymatic activity.

(vi) Tween 20 and sodium laurylsulphate both have one characteristic feature: in small quantities they are activators but in greater quantities they become inhibitors as shown by Tables VIII and IX.

TABLE VIII

| Concentration of Tween 20 in the enzyme-substrate mixture ($\gamma$ per mol.) | Activity percent |
|---|---|
| 0 | 100 |
| 50 | 105 |
| 100 | 124 |
| 150 | 148 |
| 200 | 100 |
| 300 | 0 |

TABLE IX

| Concentration of laurylsulphate in the enzyme-substrate mixture ($\gamma$ ml.) | Activity (percent) |
|---|---|
| 0 | 100 |
| 100 | 111 |
| 1000 | 29 |

(vii) Action of bile salts: the bile salts studied were desoxycholic acid, sodium taurocholate, and sodium cholate.

The action of sodium taurocholate was difficult to define since it appeared to vary greatly depending upon the origin of the salt. However, Table X shows in a general manner that in small quantities sodium taurocholate is either inactive or an activator while in larger quantities it is a strong inhibitor.

TABLE X

| Concentration of taurocholate (percent) | Activity in percent | |
|---|---|---|
| | Taurocholate No. 1 | Taurocholate No. 2 |
| 0 | 100 | 100 |
| 0.01 | 107 | 100 |
| 0.025 | 115 | 100 |
| 0.05 | 119 | 110 |
| 0.1 | 80 | 145 |
| 0.15 | 0 | |
| 0.6 | | 0 |

Furthermore, sodium desoxycholate is inhibitive while the sodium cholate is an activator, as shown by the results given in Table XI.

TABLE XI

| Concentration of bile salts (percent) | Activity in percent | |
|---|---|---|
| | Sodium cholate | Sodium desoxycholate |
| 0 | 100 | 100 |
| 0.025 | 123 | 100 |
| 0.05 | 123 | 58 |
| 0.1 | 123 | 0 |
| 0.15 | 123 | |

The results of Tables X and XI are illustrated in FIG. 5.

(viii) Glycerol has neither an inhibiting nor activating action.

(ix) Finally the action of oleic acid is of interest: oleic acid of 99.8% purity causes neither activation nor inhibition at concentrations of $4 \times 10^{-5}$ and $4 \times 10^{-4}$ M, while it causes an activation of 19% at a concentration of $2 \times 10^{-3}$ M. An impure oleic acid effects an activation of 32% at this latter concentration.

The new lipase according to the invention is thus identified on the one hand by the method by which it is obtained, i.e. essentially the specific micro-organism cultivated, and on the other hand by a series of characteristic physicochemical and biochemical properties.

This lipase is thus distinguished in a very clear manner from the known lipases. It has application in human therapy in different fields, the principal fields being digestive disturbances due to pancreatic insufficiency; secretory insufficiency due to senescence; atheromatosis; and psoriasis (which very frequently accompanies disturbances in lipid metabolism).

It should be further stated that this lipase may either be employed alone or in association with gastric extracts, bile extracts and hemicellulase.

Finally it is important to note that still more purified forms of this lipase can be obtained and can be employed in other applications. These forms are the following:

Purified forms assaying at 50,000 to 150,000 units per gram are obtained from forms assaying at 5,000 to 15,000 units per gram by fractional precipitation, by the elimination of inactive residues (an operation which can be combined with dialysis); the precipitation being carried out at low temperature (of the order of $-5°$ to $+5°$ C.) and the most convenient solvent, but not exclusively, being acetone, other solvents being lower aliphatic alcohols.

Preparation assaying at 5,000, 12,000, 15,000 to 150,000 units per gram can be used in therapeutics in the following forms:

Simple tablets (excipient: corn flour, talc)
Enteric tablets (glutenized, isokeratol)
Efferverscent tablets (excipient: bicarbonate of soda, citric acid or other excipient which when dissolved in water release $CO_2$)
Capsules (excipient: paraffin oil), these different forms containing lipase in doses of 2,500, 5,000, 25,000 or 50,000 units, and their therapeutic indications being:
All pancreatic insufficiencies whether or not accompanied by steatorrheas,
Dyspepsias,
Disorders of the assimilation of lipids,
Intolerance to fats,
Dyslipemias and disorders of the absorption of lipids in gastrectomized individuals.

The regimen is from 2 to 5 tablets or capsules per day.

Extremely purified forms assaying 2,500,000 to 3,000,000 units per gram are prepared from lipases assaying 10,000 to 30,000 units per gram which are applied to cation exchange resins, for example, of a type IRC50 or Xe64, and which may be eluted by a suitable buffer, at a pH between 5 and 6, the mineral element of the buffer used then being eliminated by any convenient method in particular by passage over a molecular sieve, for example a product of the type Sephadex G 25, by dialysis, etc.

These purified preparations may be used in injectable form, the lipase being offered in the form of lyophilized powder, which is dissolved at the time of use in a physiological saline, or a buffer.

What is claimed is:
1. A method for the preparation of a stable, highly active lipase, said method comprising cultivating the microorganism *Rhizopus arrhizus* var. *delemar*, said microorganism being registered in the Museum of Natural History in Paris, France under the registration number 1916, in a culture medium with aeration and stirring until the culture medium remains contant with respect to enzymatic activity, separating from the culture medium a filtrate containing a stable, highly active lipase and collecting the lipase contained in said filtrate, said lipase having two activity optima, a first activity optimum at about the pH of the stomach and a second activity optimum at about the intestinal pH.

2. A method as claimed in claim 1, wherein the collecting of the lipase is effected by precipitating same from the filtrate by adding acetone.

3. A method as claimed in claim 1, wherein the collecting of the lipase is effected by salting out the lipase from the filtrate by adding ammonium sulphate.

4. A method as claimed in claim 1 further comprising centrifuging the thusly collected lipase, drying the centrifuged lipase to obtain a solid dry lipase and fractionally precipitating the dry lipase from acetone or a lower aliphatic alcohol at a temperature between $-5°$ and $+5°$ C.

5. A method as claimed in claim 4 comprising forming a solution of the precipitated dry lipase and further purifying same by cation exchange chromatography.

6. A method as claimed in claim 1, wherein the cultivating of the micro-organism is effected at a pH between 5 and 7 and a temperature between 20° and 35° C.

7. A product prepared by the process as claimed in claim 1.

References Cited
UNITED STATES PATENTS

| | | | |
|---|---|---|---|
| 3,189,529 | 6/1965 | Yamada et al. | 195—62 |
| 3,262,863 | 7/1966 | Fukumoto et al. | 195—66 |

OTHER REFERENCES

Alford et al. Journal of Lipid Research, July 1964, vol. 5, pp. 390–394.

LIONEL M. SHAPIRO, Primary Examiner

U.S. Cl. X.R.

195—66; 424—94